US009183479B2

(12) United States Patent
Gelinotte et al.

(10) Patent No.: US 9,183,479 B2
(45) Date of Patent: Nov. 10, 2015

(54) VALUE TOKEN WITH SLUG HAVING RFID AND ELECTROMAGNETIC DETECTION FEATURES

(71) Applicant: GAMING PARTNERS INTERNATIONAL CORPORATION, Las Vegas, NV (US)

(72) Inventors: Emmanuel Gelinotte, Savigny les Beaune (FR); Chrispohe Maurice Liboi, Beaune (FR); Regis Marcel Roger Vicaire, Marigny les Reullee (FR); Francisco Javier Moreno, Yuma, AZ (US); Kirsten Clark, Las Vegas, NV (US); Joseph Brooks Friedman, Henderson, NV (US); Gregory Scott Gronau, Las Vegas, NV (US)

(73) Assignee: Gaming Partners International Corporation, Las Vegas, NV (US)

( * ) Notice: Subject to any disclaimer, the term of this patent is extended or adjusted under 35 U.S.C. 154(b) by 0 days.

(21) Appl. No.: 14/272,850

(22) Filed: May 8, 2014

(65) Prior Publication Data
US 2014/0332597 A1 Nov. 13, 2014

Related U.S. Application Data

(60) Provisional application No. 61/822,025, filed on May 10, 2013.

(51) Int. Cl.
*G06K 19/06* (2006.01)
*G06K 19/04* (2006.01)
*G06K 19/077* (2006.01)

(52) U.S. Cl.
CPC ........ *G06K 19/047* (2013.01); *G06K 19/07749* (2013.01); *Y10T 29/49018* (2015.01)

(58) Field of Classification Search
CPC ............ G06K 19/06206; G06K 19/07; G06K 19/07703; G06K 19/0702; G06K 19/077; G06K 19/07722; G06K 19/06187; G06K 19/0718; G06K 1/125; G06K 13/07; G06K 17/00; G06K 19/06196; G06K 19/0719; G06K 19/07749; G06K 19/047; G06K 19/061
USPC .................. 235/492, 486, 487, 488, 380, 382
See application file for complete search history.

(56) References Cited

U.S. PATENT DOCUMENTS 5,166,502 A 11/1992 Rendleman et al.
5,895,321 A 4/1999 Gassies et al.
(Continued)

FOREIGN PATENT DOCUMENTS

WO WO 2007/100945 9/2007

*Primary Examiner* — Thien M Le
(74) *Attorney, Agent, or Firm* — Baker & Hostetler LLP

(57) ABSTRACT

Value tokens, e.g. gaming chips, are formed with a slug having an RFID microchip embedded or encapsulated inside and an EM coil either embedded or encapsulated inside or wrapped around the periphery of the slug. The slug is formed by injection molding two plastic halves with a spacing therebetween for accepting the RFID microchip. The plastic halves are formed from weighted plastic including fillers such as copper, brass and/or tungsten to add extra weight to the plastic halves. The EM coil is placed on the same radius as the RFID antenna within the gaming chip or at a radius outside the RFID antenna to as to minimize interference between the RFID and EM signals by minimizing the metal in the EM field. For example, the EM coil may be wound within a groove around the outer periphery of the slug.

17 Claims, 2 Drawing Sheets

(56) References Cited

U.S. PATENT DOCUMENTS

| | | |
|---|---|---|
| 6,264,109 B1 | 7/2001 | Chapet et al. |
| 6,296,190 B1 | 10/2001 | Rendleman |
| 6,581,747 B1 | 6/2003 | Charlier et al. |
| 7,866,563 B2 | 1/2011 | Chapet |
| 7,918,455 B2 | 4/2011 | Chapet et al. |
| 7,926,725 B2 | 4/2011 | Charlier et al. |
| 7,931,204 B2 | 4/2011 | Chapet |
| 7,942,334 B2 | 5/2011 | Charlier et al. |
| 2007/0105616 A1 | 5/2007 | Chapet et al. |
| 2007/0278314 A1 | 12/2007 | Chapet |
| 2008/0164326 A1* | 7/2008 | Iwakata et al. ............ 235/492 |
| 2008/0255327 A1* | 10/2008 | Qin et al. ................. 526/136 |
| 2009/0146373 A1 | 6/2009 | Chapet |
| 2011/0279340 A1* | 11/2011 | Kato et al. ............... 343/793 |
| 2012/0023737 A1* | 2/2012 | Thomsen et al. .......... 29/592.1 |
| 2012/0038445 A1* | 2/2012 | Finn ......................... 336/105 |
| 2012/0280035 A1* | 11/2012 | Liu et al. .................. 235/380 |
| 2014/0176447 A1* | 6/2014 | Alameh et al. ............ 345/173 |

* cited by examiner

VALUE TOKEN WITH SLUG HAVING RFID AND ELECTROMAGNETIC DETECTION FEATURES

CROSS-REFERENCE TO RELATED APPLICATIONS

The present application claims priority to U.S. Provisional Patent Application No. 61/822,025, filed May 10, 2013. The content of that application is hereby incorporated by reference in its entirety.

TECHNICAL FIELD

The invention relates to value tokens. Value tokens are physical objects that represent cash or other value and are acceptable, at least in certain circumstances, as having a represented cash equivalent or other value. Exemplary among the uses of value tokens are their use in casino gaming where, as chips, plaques or jetons, they form a basis for placing, tracking and honoring wagers. Value tokens also take the form of traditional coinage or currency in common use worldwide. Further, value tokens may be used, e.g. commercially, to represent value in the context of rewards, opportunities, premiums, and the like. In this context, value tokens may be redeemed for other things of value or opportunities having value. The present invention may find utility in any or all of these applications, and, indeed, in all applications where a physical object stands for or represents something of value. The exemplary value tokens described herein are adapted to have RFID and electromagnetic detection features to enable tracking of the value tokens and to prevent counterfeiting and theft.

BACKGROUND

Value tokens, such as casino gaming chips, have the attributes of currency and, accordingly, significant steps are taken to track the location and value of such value tokens as well as to prevent their counterfeiting and theft. For example, gaming chips with transponders formed therein are described in U.S. Pat. Nos. 5,166,502; 5,895,321; 6,264,109; 6,296,190; 6,581,747; 7,866,563; 7,918,455; 7,926,725; 7,931,204; and 7,942,334. As described in these applications, the transponders may be molded within plastic injection molded gaming chips and detected using conventional RFID detectors or other readers. The transponders typically transmit unique identification information and value information to such readers for detection and verification. However, it is generally desired that such gaming chips have heavier weights for easier manipulation by the gaming customers and dealers. Accordingly, many gaming chips are formed with metal (e.g., brass) slugs within the plastic outer coverings to add the desired weight.

For example, conventional gaming chips are formed by overmolding an injection molded plastic rim around a brass coin or other metal slug. The metal slug is selected to account for at least 50% of the weight (e.g. 12-13 grams) of the gaming chip, while the plastic accounts for the other 50% of the weight. A label or decal is then added over the visible surface of the gaming chip. Unfortunately, such slugs interfere with the operation of high frequency RFID transponders by forming a high frequency shield that detunes the RFID transponders, typically preventing such gaming chips from including RFID transponders.

One way to address this problem is to provide the RFID microchip and RFID antenna on top of the gaming chip. For example, the antenna may be printed onto the chip using, e.g. conducting ink, at a position on top of the metal slug. The RFID microchip and printed antenna is then covered by a decal so that it is not apparent to the user. Alternatively, an RFID inlay is provided between the metal inlay and the decal for accepting the RFID microchip. However, such designs have numerous problems including, for example, rupture of electrical contacts by peeling off, destruction of the RFID microchip in the event of shock, as when two chips are "banged" against each other or when one gaming chip is hit with the edge of another gaming chip, deactivation of the RFID microchip by scraping with a nail, removal of the RFID microchip, and the like. Also, the metal slug still shields and detunes the RFID signal and may not work at all unless the density of the metal is significantly reduced.

Thus, while it remains desirable to design gaming chips and other value tokens with the desirable weights afforded by metal slugs, the use of the metal slugs has heretofore dictated designs that render the transponders either ineffective or subject to damage. It is desired to design value tokens, including gaming chips, that enable use of RFID microchips without the aforementioned shortcomings in prior art gaming chip designs.

Those skilled in the art will further appreciate that counterfeiting and theft remain a problem with value tokens. Numerous security features such as watermarks, special fluorescent inks, security pigments, holograms, encryption of the values stored in the RFID microchips, and the like are commonly used to make counterfeiting more difficult. Also, electromagnetic (EM) materials such as, but not limited to, coils or metallic detectable foils, are conventionally applied to gaming chips to help deter employees from unauthorized attempts to remove the value tokens from the casino floor. Portable handheld electromagnetic detection devices or gates at the exits may be used to detect such devices by detecting resonation of the electromagnetic materials at the EM detection frequencies. Detection of such resonation causes an alarm to sound if a value token with EM materials are taken past an employee exit gate or are detected by the portable handheld EM detection devices. Such devices are similar to those used by many retail establishments to prevent theft.

The use of the EM materials in gaming chips is limited by the dimensions of the gaming chip. For example, when the EM material is placed beneath the decal, the surface is quite limited. EM material lengths of at least 32-50 mm are desired for reliable detection; however, gaming chips are limited in size to a 40-55 mm diameter, and it is difficult to provide a long decal or label on gaming chips. Typically, the label diameter is limited to 22-24 mm by the gaming chip's disc surface. Such an antenna size is typically insufficient for acceptable EM detection.

One way to address these problems has been to provide a thin metallic foil with hard metal micro-grooves in a metal pad under the decal, one on each side of the gaming chip. However, the metal foil provides a Faraday shield effect at high RF frequencies such as the 13.56 MHz and above signals used for conventional RFID detection. In short, the sensitivity of the RFID antenna to metal shields detunes the RFID antenna rendering it ineffective when such EM foils are provided in the same gaming chip.

As a result, it is typically impossible to provide the EM materials and the RFID detection elements together on the same value token due to interference of the EM and RFID signals. Accordingly, it is desired to design a value token that has the desired weight for handling while permitting the use of RFID microchips and EM detection without unacceptable interference. The invention has been designed to address these and other needs apparent from the following detailed description of the invention.

SUMMARY

The invention addresses the afore-mentioned and other unspecified needs in the art by providing value tokens, e.g. gaming chips, having an RFID microchip molded inside a slug of the gaming chip and an EM coil either molded inside the slug or wrapped around the periphery thereof. The slug is formed by injection molding two plastic halves with a spacing therebetween for accepting the RFID microchip. In an exemplary embodiment, the plastic halves are formed from weighted plastic including fillers such as copper and/or tungsten to add extra weight to the plastic halves. The RFID microchip is placed between the plastic halves and comprises a module connected to a coiled copper wire antenna that is welded using, for example, thermo-compression so as to provide the highest resistance to shocks, vibrations, and centrifugal force. The RFID microchip is preferably embedded in a casing that makes it inaccessible without destroying the slug. Also, by using a copper wire coil instead of conducting ink, the RFID signal can be read over a greater range, with about a 15-20% range improvement, especially when the gaming chips include some metal. The EM coil is placed on the same radius as the RFID antenna within the slug or at a radius outside the RFID antenna to as to minimize interference between the RFID and EM signals by minimizing the metal in the EM field. For example, the EM coil may be wound within a groove around the outer periphery of the slug.

BRIEF DESCRIPTION OF THE DRAWINGS

Embodiments of the invention can be better understood with reference to the following drawings.

DETAILED DESCRIPTION OF ILLUSTRATIVE EMBODIMENTS

Figure 1:
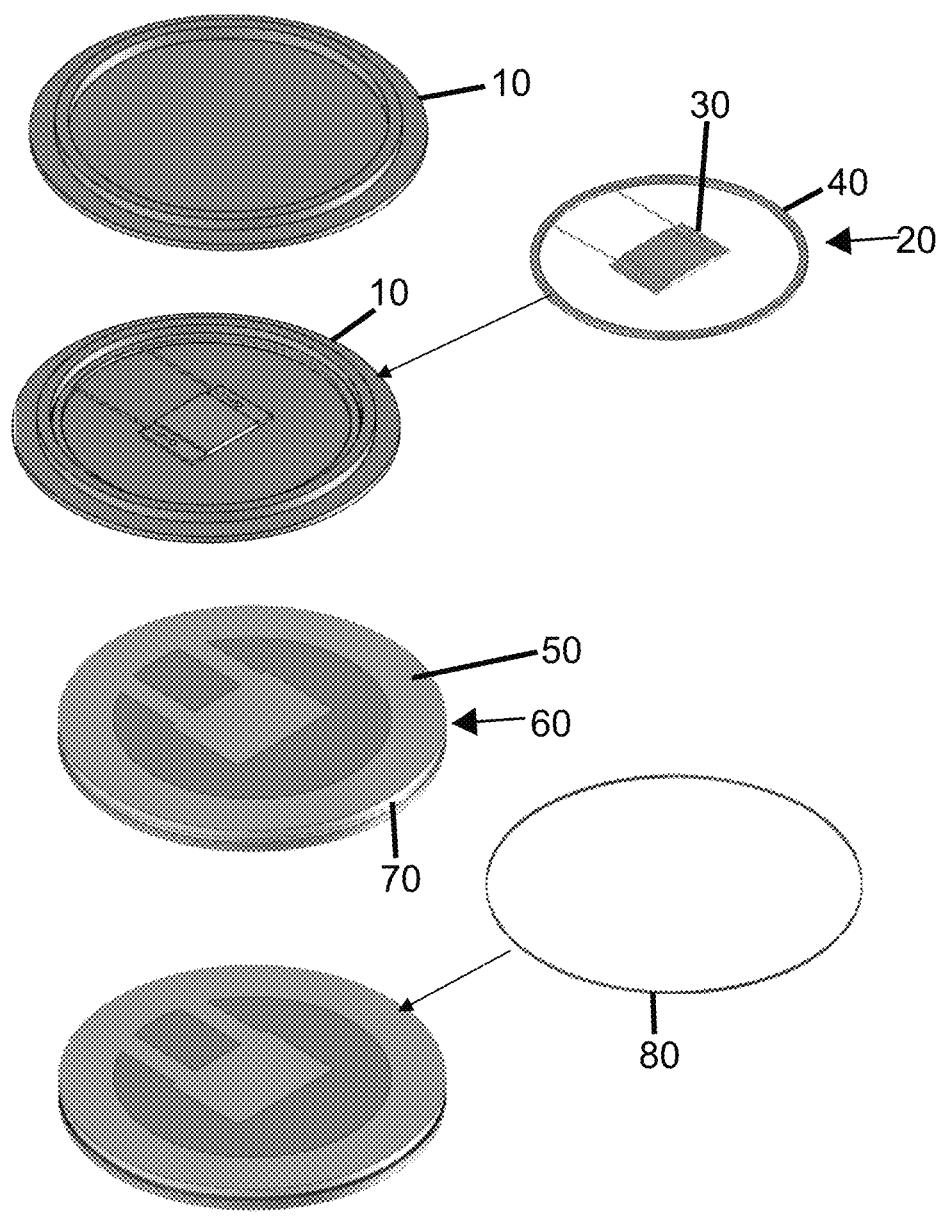
FIG. 1 illustrates a value token in the form of a slug of a gaming chip having an embedded RFID tag and EM coil in a peripheral groove in accordance with a first embodiment.
Figure 2:
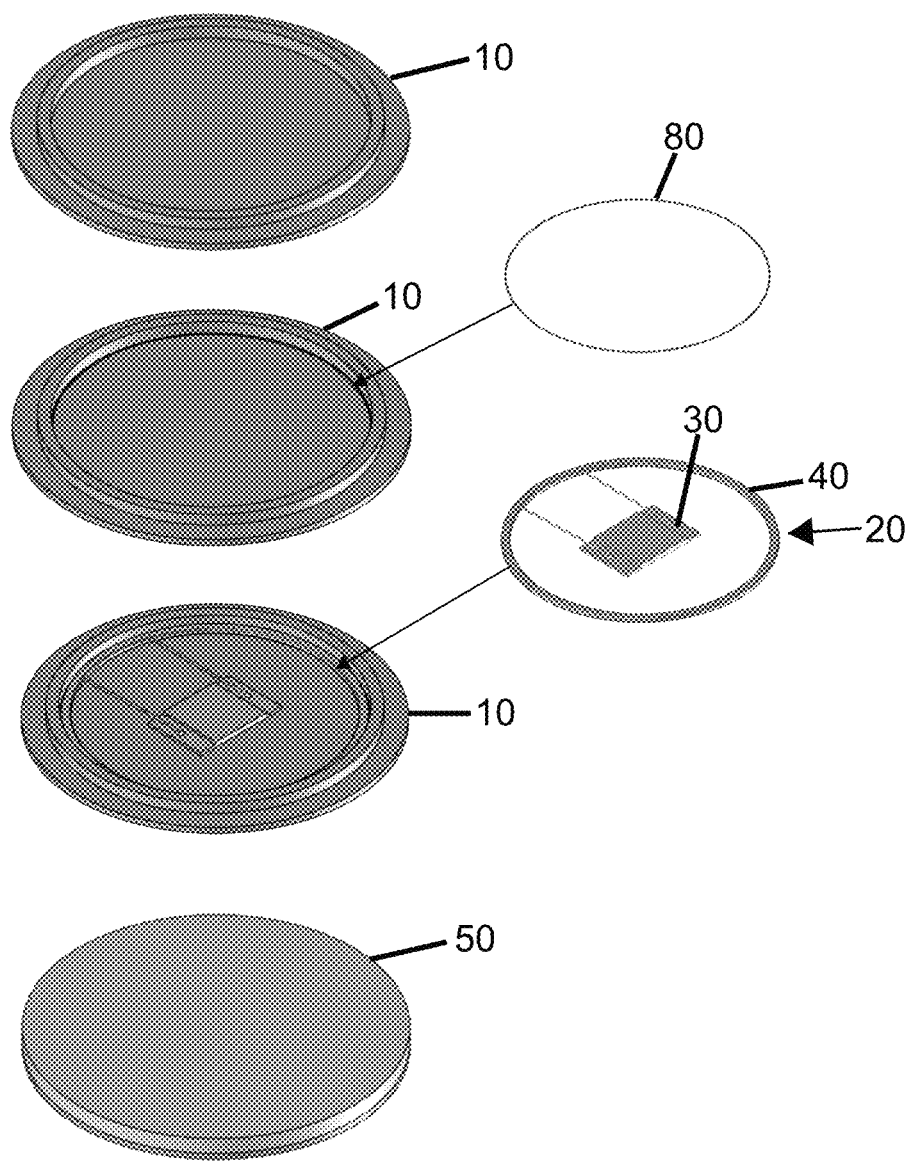
FIG. 2 illustrates a value token in the form of a slug of a gaming chip having an embedded RFID tag and EM coil in accordance with a second embodiment.

The invention will be described in detail below with reference to FIGS. 1 and 2. Those skilled in the art will appreciate that the description given herein with respect to those figures is for exemplary purposes only and is not intended in any way to limit the scope of the invention. All questions regarding the scope of the invention may be resolved by referring to the appended claims.

As noted above, a "value token" is a general term for physical objects that represent cash or other value and, in casino gaming embodiments, may be in the form of gaming chips, plaques, or jetons. For ease of description, the term "value token" is used interchangeably with "gaming chip" herein, although it should be understood that, in each case of such use, a plaque, jeton, or other physical object such as a coin is contemplated as well.

In exemplary embodiments, value tokens such as gaming chips are modified to include RFID transponders while maintaining their weight. The conventional metal (e.g. brass) slug is removed and is replaced with high density fillers such as copper, brass, and/or tungsten mixed in heavy plastic to form a "weighty" material that encapsulates the RFID microchip to form a non-metallic disk. Preferably, the high density fillers are mixed in such a way that the resulting plastic has low conduction characteristics. The plastic is formed into the respective chip halves of the slug that encapsulate the RFID microchip using, for example, injection molding techniques of the type described in U.S. Pat. No. 5,895,321. The resulting value token may also be formed to include secure values as described in U.S. patent application Ser. No. 13/887,683, filed May 6, 2013, as well as to include other security features known in the art. The EM feature is added without adding a metal foil by instead adding a metal wire or coil that is placed so as to not affect radio communications with the encapsulated RFID microchip.

In a first embodiment, this is accomplished by creating a groove around the outside edge of the slug and winding a coil in the groove. The coil is preferably a micro-wire comprising an amorphous metal wire (e.g., 70 micron diameter) coated with glass and treated to provide a specific resonance frequency appropriate for EM resonance detection. FIG. 1 shows an exploded view of an exemplary slug of a gaming chip in accordance with the first embodiment. As illustrated, a first injection molded plastic part 10 with high density filler receives an RFID tag 20 including an RFID microchip 30 and an antenna 40. The RFID tag 20 may be formed with a circular or other form fitting antenna 40 in a manner similar to that described in U.S. Pat. No. 7,918,455, for example. A second injection molded plastic part 50 with high density fillers fits snugly with the first plastic part 10 to form a finished slug 60 having a groove 70 around its periphery for accepting the micro-wire antenna 80. During manufacture, the first and second injection molded parts 10 and 50 are formed, the RFID microchip 30 with its antenna 40 is placed into the first injection molded part 10, and the assembly is placed back in the injection mold to apply pressure and/or heat to overmold and to add a cover shot. The cover shot fuses with the first injection molded part 10. Once the slug 60 is formed, the micro-wire antenna 80 is introduced into the groove 70. In an exemplary embodiment, the micro-wire 80 is wound in the groove 70 around the circumference of the finished slug 60 for 2-4 turns.

Those skilled in the art will appreciate that, although the micro-wire 80 is wrapped in a groove 70, micro-wire 80 is not covered by plastic and may be exposed to the elements. It may also come unraveled. Accordingly, an embodiment is desired in which the micro-wire 80 is also encapsulated within the finished slug 60 along with the RFID tag 20. In the embodiment of FIG. 2, no groove is provided around the peripheral edge of the slug. Instead, the micro-wire (coil) 80 is disposed inside the slug with the RFID tag 20 before overmolding during manufacture as described above with respect to FIG. 1. As shown in FIG. 2, the micro-wire 80 may be stacked in the same channel as the antenna 40. In such an embodiment, it may be desirable to insulate the micro-coil 80 and/or the antenna 40. For example, as noted above, the micro-wire 80 may be coated with a glass insulator or any kind of varnish. The antenna 40 may be formed of coiled copper wire that is welded using, for example, thermo-compression so as to provide the highest resistance to shocks, vibrations, and centrifugal force. Alternatively, the micro-wire 80 may be placed in a different channel (not shown) that is just outside the radius of the antenna 40. In either case, the EM antenna is formed by a micro-wire 80 and placed so as to minimally impact the operation of the RFID tag 20 by limiting the metal shielding in the field of the RFID tag 20.

Those skilled in the art will appreciate that the embodiments described herein permit the value token to include RFID tags and EM coils in the same value token with minimal field interference. The key is that the EM coil 80 has the same or greater diameter than the RFID antenna 40 and that one or both elements be encapsulated in the value token to minimize damage and to improve performance.

Those skilled in the art will appreciate that the invention may be applied to other applications and may be modified without departing from the scope of the invention. For example, the value tokens need not be round but may be square, rectangular, pentagonal, hexagonal, and the like. Accordingly, the scope of the invention is not intended to be limited to the exemplary embodiments described above, but only by the appended claims.

What is claimed:

1. A value token comprising a slug including an RFID microchip and RF antenna encapsulated within two outer plastic layers and an electromagnetic coil adapted to provide a specific resonance frequency appropriate for electromagnetic resonance detection, said electromagnetic coil disposed at the same or a greater diameter than the RF antenna so as to limit field interference with the RF antenna.

2. A value token as in claim 1, wherein the two outer plastic layers include high density fillers mixed with the plastic.

3. A value token as in claim 2, wherein the high density fillers comprise copper, brass and/or tungsten.

4. A value token as in claim 1, wherein the slug is circular and the RF antenna is circular and has a smaller diameter than the slug.

5. A value token as in claim 4, wherein the two outer plastic layers form a groove around an outer peripheral surface of said slug, wherein the electromagnetic coil is disposed in said groove.

6. A value token as in claim 4, wherein the electromagnetic coil is circular and has a diameter that is greater than or equal to a diameter of the RF antenna.

7. A value token as in claim 6, wherein the electromagnetic coil and RF antenna have approximately the same diameter and are stacked on top of each other within the two outer plastic layers.

8. A value token as in claim 6, wherein the electromagnetic coil is placed in a channel that is outside a radius of the RF antenna.

9. A value token as in claim 1, wherein the electromagnetic coil comprises a wrapped micro-wire.

10. A method of forming a value token comprising a slug, comprising the steps of forming the slug by placing an RFID microchip and RF antenna between two outer plastic layers, forming a groove around an outer peripheral surface of the two outer plastic layers when combined, combining the two outer plastic layers, and placing an electromagnetic coil in said groove so as to limit field interference with the RF antenna, said electromagnetic coil adapted to provide a specific resonance frequency appropriate for electromagnetic resonance detection.

11. A method as in claim 10, further comprising forming the two outer plastic layers from plastic mixed with high density fillers.

12. A method as in claim 11, wherein the high density fillers comprise copper, brass and/or tungsten.

13. A method as in claim 10, further comprising forming the slug in a circular shape, wherein the RF antenna is circular and has a smaller diameter than the slug.

14. A method as in claim 10, wherein placing the electromagnetic coil in said groove comprises wrapping a micro-wire in the groove to form said electromagnetic coil.

15. A method of forming a value token comprising a slug, comprising the steps of forming the slug by placing an RFID microchip and RF antenna between two outer plastic layers, placing an electromagnetic coil between said two outer plastic layers whereby the electromagnetic coil is placed on or outside a periphery of said RF antenna so as to limit field interference with the RF antenna and the electromagnetic coil is adapted to provide a specific resonance frequency appropriate for electromagnetic resonance detection, and combining the two outer plastic layers.

16. A method as in claim 15, wherein the RF antenna and electromagnetic coil are circular, said electromagnetic coil having a diameter that is greater than or equal to the diameter of the RF antenna.

17. A method as in claim 16, wherein the electromagnetic coil and RF antenna have approximately the same diameter, further comprising stacking the electromagnetic coil and RF antenna on top of each other within the two outer plastic layers.

* * * * *